United States Patent [19]

Tomino et al.

[11] 4,407,574

[45] Oct. 4, 1983

[54] CAMERA WITH FOCAL PLANE SHUTTER

[75] Inventors: Naoki Tomino, Kawasaki; Masaaki Tsukamoto, Tokyo, both of Japan

[73] Assignee: Nippon Kogaku K.K., Tokyo, Japan

[21] Appl. No.: 418,292

[22] Filed: Sep. 15, 1982

Related U.S. Application Data

[63] Continuation of Ser. No. 340,842, Jan. 20, 1982, abandoned, which is a continuation of Ser. No. 154,869, May 30, 1980, abandoned.

[30] Foreign Application Priority Data

Jun. 9, 1979 [JP] Japan .................................. 54-71846

[51] Int. Cl.³ .................. G03B 7/089; G03B 9/36; G03B 19/12
[52] U.S. Cl. ................................... 354/50; 354/56; 354/154; 354/246
[58] Field of Search ................. 354/48, 49, 50, 51, 354/56, 154, 226, 246

[56] References Cited

U.S. PATENT DOCUMENTS

| | | | |
|---|---|---|---|
| 3,999,196 | 12/1976 | Inoue | 354/154 |
| 4,141,634 | 2/1979 | Inoue | 354/154 |
| 4,181,412 | 1/1980 | Holle et al. | 354/56 X |
| 4,226,516 | 10/1980 | Tsunekawa | 354/60 E |

Primary Examiner—Michael L. Gellner
Attorney, Agent, or Firm—Fitzpatrick, Cella, Harper & Scinto

[57] ABSTRACT

In a camera of the type which is provided with a focal plane shutter having a group of opening blades and a group of closing blades and a light receiving element for metering the light transmitted through a photographing lens, the improvement comprises an additional light shielding member provided in the path of photographing light on the front side of the focal plane shutter relative to the transmitted light. The light shielding member is so disposed as to be able to reflect the photographing light toward the light receiving element. Retracting means brings the light shielding member to a position out of the photographing light path prior to exposure.

23 Claims, 7 Drawing Figures

CAMERA WITH FOCAL PLANE SHUTTER

This is a continuation, of application Ser. No. 340,842, filed Jan. 20, 1982, now abandoned, which was a continuation of Ser. No. 154,869, filed May 30, 1980, now abandoned.

BACKGROUND OF THE INVENTION

1. Field of the Invention

The present invention relates to a camera with a focal plane shutter and more particularly the present invention is directed to an additional light shielding device for such focal plane shutter comprising a group of opening blades and a group of closing blades able to cover the whole area of aperture by a combination of these blades.

2. Description of the Prior Art

The reflection photometry is well known in the art and various systems for carrying out this TTL reflection photometry have already been proposed. According to TTL reflection photometry, the light transmitted through a photographing lens is reflected upon the surface of a focal plane shutter and the reflected light is measured photometrically. The above-mentioned type of focal plane shutter consisting of a group of opening blades and a group of closing blades is generally called a divided type focal plane shutter. It is a common knowledge in the art that the application of the above-mentioned reflection photometry system to the divided type focal plane shutter involves some difficult problems. One of the most important problems is leakage of light. Since a plural number of shutter blades cover the film, the light can come in through each overlapping portion of neighbouring blades. This is particularly true for a range finder type of camera which has no member serving as a shade such a quick return mirror between the photographing lens and the shutter blades. In the range finder type of camera, therefore, the light transmitted through the photographing lens enters the shutter directly, which enhances the problem of light leakage. This brings forth a particular difficulty when the reflection photometry system is applied to such type of camera.

The same problem arises also in case of the so-called direct photometry according to which the light reflected upon both the shutter surface and the film surface is measured photometrically. For direct photometry it is desired to increase the reflection power of the shutter up to a value nearly equal to that of the film surface. However, such increase of reflection power of the shutter results in increase of leak light. Therefore, in practice, it is very difficult to apply the direct photometric system to the divided type focal plane shutter.

SUMMARY OF THE INVENTION

Accordingly, it is an object of the invention to provide a camera which has a highly improved light shielding capacity for the divided type focal plane shutter enough to allow the use of a reflection photometry system therefor.

To attain the object according to the invention a light shielding member is provided additionally in the path of photographing light at the front side of the divided type focal plane shutter relative to the light transmitted through the photographing lens. The light shielding member is so formed as to reflect the light toward the light receiving element at its working position and to be retractable to its retracted position out of the light path when exposure is made for taking a picture.

Other and further objects, features and advantages of the invention will appear more fully from the following description taken in connection with the accompanying drawings.

DESCRIPTION OF THE PREFERRED EMBODIMENTS

Figure 1:
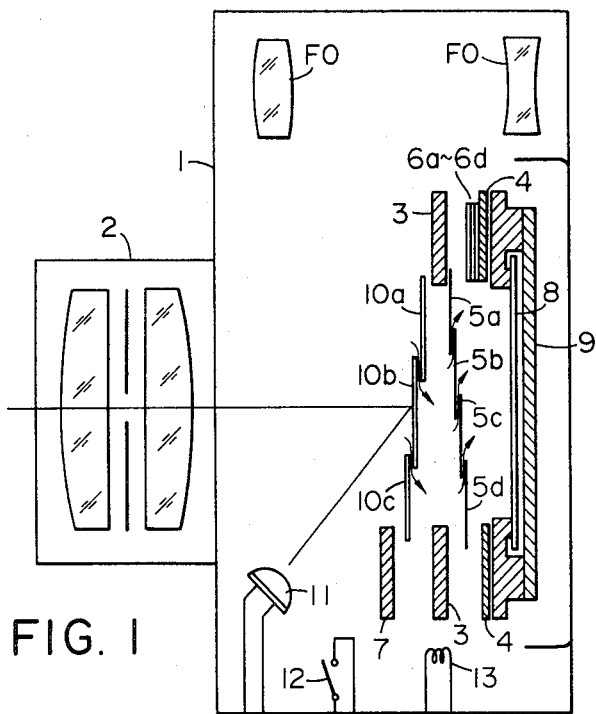
FIG. 1 shows, in cross section, the first embodiment of the invention.
Figure 2:
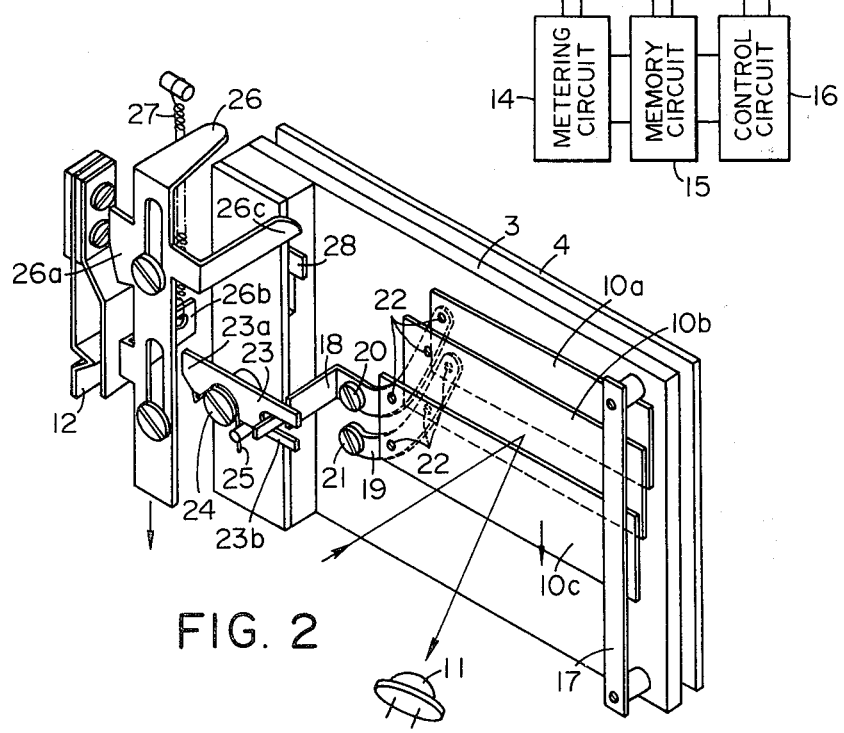
FIG. 2 is a perspective view of the mechanism within the first embodiment.

FIGS. 1 and 2 show an embodiment of the invention in which the present invention is applied to a range finder type of camera.

Designated by 1 is a camera body to which a photographing lens 2 is removably mounted. FO designates a finder optical system. A group of opening blades 5a, 5b, 5c, 5d and a group of closing blades 6a, 6b, 6c, 6d sandwiched between two shutter base plates 3 and 4 constitute together a divided type focal plane shutter. Behind the aperture there are a film 8 and a pressing plate 9. A light shielding member 10 is provided immediately before the focal plane shutter. The light shielding member 10 is divided into three plates 10a, 10b, 10c and is retractable downward, that is, in the same direction as the running direction of the opening blades. In the retracted position, the three plates are received in the form of a stack. In the charged working position shown in FIG. 1, the three plates 10a–10c sufficiently reflect the photographing light coming through the photographing lens 2. To this end, the surface of each plate facing the lens 2 is formed as a surface of high reflection power such as a white surface. At a position out of the photographing light path and suitable to receive the reflected light from the light shielding member, a light receiving element 11 is provided. In the shown embodiment, the light receiving element 11 is disposed at the bottom portion of the camera body. But, it may be positioned at the upper portion. As to the position at which the light receiving element is to be placed, there is no limitation provided that it can receive the reflected light from the surface of the light shielding member 10.

The light receiving element 11 produces an output in proportion to the brightness of the object and the output is introduced into a metering circuit 14 for amplification and operation.

With this arrangement, when the shutter is in the charged position shown in FIG. 1, the transmitted light through the lens 2 is completely blocked by the light shielding member 10a–10c arranged immediately before the focal plane shutter 5a–5d, 6a–6d. Therefore, in this position, the light never enters reaches the film 8 through the gaps between blades of the opening blade group 5a–5d. The light is reflected upon the surface of the light shielding member 10a–10c and a sufficient amount of the reflected light enters the light receiving element 11 for TTL metering.

Referring to FIG. 2, reference numeral 26 designates a release lever which is slidable in the direction indicated by arrow against the force of a spring 27 by pushing down a release button (not shown). During the slide movement at first the release lever 26 turns a memory switch 12 on through its cam surface 26a. At this time point, a signal coming from a metering circuit 14 is stored in a memory circuit 15.

A further downward slide movement of the release lever 26 makes its projection part 26b contact with one end 23a of a lever 23 so that the lever 23 is rotated counter-clockwise against the force of a spring 25. The other end of the lever 23 is formed as a forked end which is in engagement with main arm 18 of the light shielding member in the manner shown in the drawing. As the lever 23 is rotated counter-clockwise, the main arm 18 is rotated clockwise about a rotation axis 20. The main arm 18 has pins 22 by which the plates 10a–10c of the light shielding member are rotatably supported. A sub-arm 19 rotatable about an axis 21 also has pins 22 which also rotatably support the shading plates 10a–10c. With the clockwise rotation of the arm 18, the light shielding member 10a–10c executes a link motion limited by the sub-arm 19. Thus, the light shielding member begins moving to its retracted position out of the photographing light path. A guide plate 17 is provided to guide this movement of the light shielding member.

After some further slide movement of the release lever 26, the retraction of the light shielding member is completed and the opening blade group 5a–5d is exposed. At the same time, another projection part 26 of the lever 26 contacts an opening blade releasing lever 28 and pushes it down so that the opening blades 5a–5d are released from the engaged state and allowed to start running.

A control circuit 16 shown in FIG. 1 sets a delay time depending upon the signal stored in the memory circuit 15. After the lapse of the delay time, a magnet 13 is deenergized to allow the closing blade group 6a–6d to start running. In this manner, the shutter is opened and closed to give a proper exposure time correctly corresponding to the brightness of the object prevailing at that time.

Designated by 7 is a shelter wall having a surface of low reflection power such as a black surface. When retracted, the three plates 10a, 10b, 10c are overlaid on each other to form a stack of plates and the stack is placed behind the shelter wall 7. If the shelter wall is omitted, then the light shielding member in its retracted position will reflect light at the time of shooting, which may cause some trouble such as flare.

As shown in FIG. 1, the blades of the opening blade group 5a–5d are overlapped in the manner that leakage of light through each overlapping portion of the neighbouring blades may occur in the direction indicated by arrow, that is, from below to above. On the contrary, the plates 10a–10c of the light shielding member are overlapped in the manner that leakage of light may occur in the opposite direction, that is, from above to below. This arrangement serves to improve the light shielding effect of the light shielding member in a simple manner.

Figure 3:
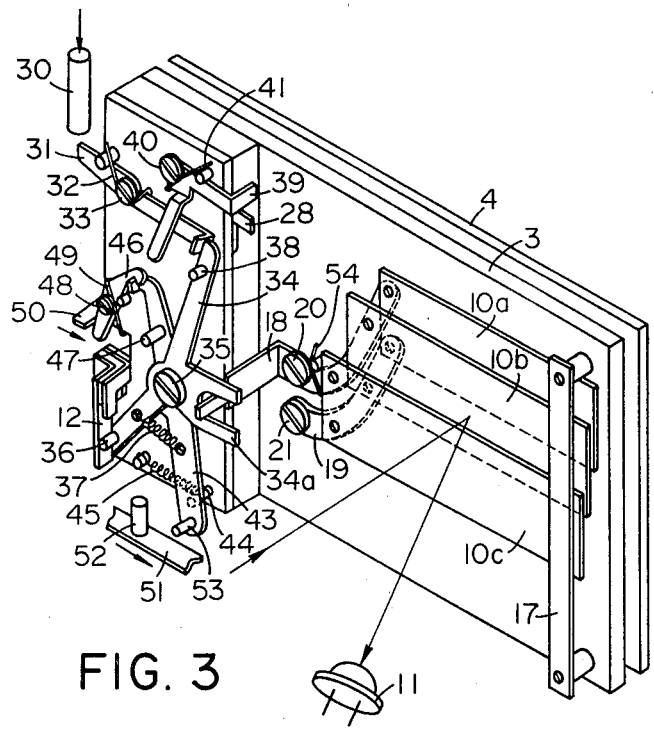
FIG. 3 shows the second embodiment of the invention in a view similar to FIG. 2.

FIG. 3 shows the second embodiment of the invention. In this embodiment, the light shielding member 10a–10c is quick-returned. The light shielding member is retracted simultaneously with or prior to the running of the opening blade group and then returned to its original position to close the aperture simultaneously with or subsequent to the running of the closing blade group. Thus, the light shielding effect is improved while photo metering is always possible.

In FIG. 3, reference numeral 30 designates a shutter release button. When it is pushed down, the bottom end of the button presses a lever 31 to rotate it about an axis 33 counter-clockwise against the force of spring 32. A light shielding member retracting lever 34 is disengaged from the curved portion at another end of the lever 31. Therefore, the retracting lever 34 is allowed to rotate about an axis 35 counter-clockwise under the action of a spring 37. At the initial stage of the rotation of the lever 34, the engagement of a pin 36 on the lever with the movable contact of the memory switch 12 is removed so that the switch is turned on. At the second stage of rotation of the lever 34, the forked portion 34a of the lever comes into contact against the main arm 18 of the light shielding member and makes the arm rotate about the axis 20 clockwise against the force of spring 54. This rotation of the arm 18 continues until the light shielding member 10a–10c is moved downwardly from the position in the photographing light path to the retracted position by a link motion. At the last stage of the counter-clockwise rotation of the lever 34, a pin 38 on the lever comes into contact against a lever 39 and makes the latter rotate a pin 40 against the force of spring 41. Thereby the opening blade release lever 28 is pushed down so that the opening blade group starts running.

Now, an exposure is carried out for a proper exposure time determined by the output from the light receiving element 11 which received the reflected light from the light shielding member 10a–10c. After the lapse of the exposure time, the closing blade group is closed and in link with this closing motion a lever 50 starts moving in the direction indicated by arrow. The lever 50 strikes a lever 46 which is therefore rotated counter-clockwise about a pin 48 against the force of spring 49. A light shielding member returning lever 43 is disengaged from lever 46 and is allowed to rotate clockwise about an axis 48 under the action of spring 45. With the clockwise rotation of the lever 43, a pin 47 provided thereon rotates the lever 34 clockwise and returns it to the home position engaged with the lever 31. At this step, the main arm 18 follows the rotation of the lever 34 and rotates counter-clockwise. Thus, the light shielding member 10a–10c is returned to its working position in the photographing light path.

By winding up the film using a winding lever (not shown), a charge lever 51 is moved in the direction indicated by arrow. The lever 51 in turn rotates the lever 43 counter-clockwise through pins 52 and 53. The lever 43 comes into engagement with the lever 46 and again assumes in the position ready for release.

Figure 4:
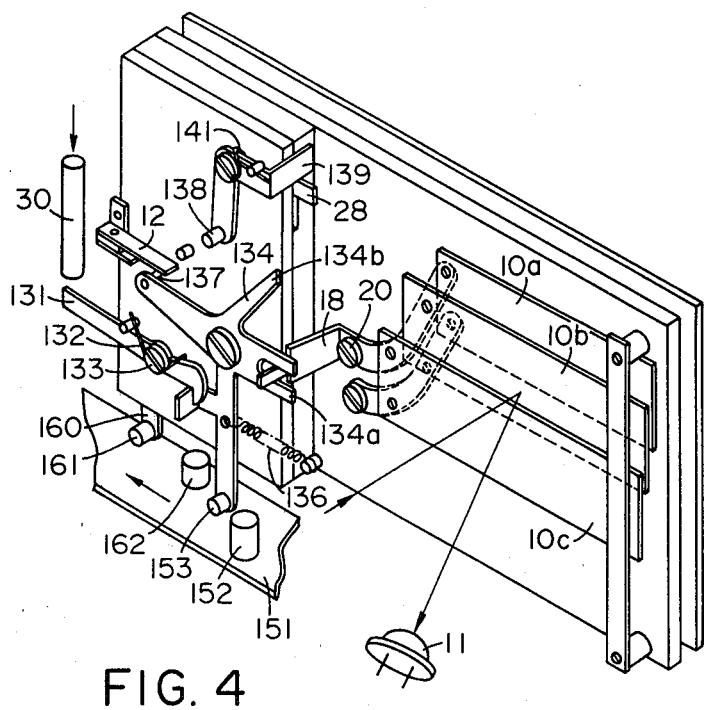
FIG. 4 shows the third embodiment of the invention in a view similar to FIG. 2.

FIG. 4 shows the third embodiment of the invention. When the release button 30 is pushed down, its bottom end presses one end of a lever 131 down so as to rotate the lever counter-clockwise about the axis 33 against the force of spring 132. Thereby, a lever 134 is disengaged from the lever 131 and allowed to rotate counter-clockwise under the action of spring 136. With the counter-clockwise rotation of the lever, a pin 137 on one end of the lever 134 moves away from the memory switch 12. Thus, the memory switch is turned on.

The main arm 18 with its forked end portion 134a being in engagement with the lever 134 follows the rotation of the lever and starts rotating clockwise about the axis 20 so as to retract the light shielding member 10a–10c to its retracted position out of the photographing light path in the same manner as previously described.

At this time, one arm end 134b of the lever 134 strikes a pin 138 on a lever 139 so that the lever 139 is rotated clockwise against the force of spring 141. Therefore, the opening blade release lever 28 is pushed down to allow the opening blade group to start running. After the lapse of a time determined by the output from the light receiving element depending on the reflected light from the light shielding member, the closing blade group is started running to effect an exposure on the film.

By rotating a film winding lever (not shown), a charge lever 151 is moved in the direction indicated by arrow. This movement of the charge lever 151 causes a clockwise rotation of the lever 134 through pins 152 and 153. Thereby, the main arm 18 is rotated and the spring 136 is brought into the charged position. With the rotation of the arm 18, at first the light shielding member 10a–10c is returned to its working position in the photographing light path. Thereafter, a pin 162 provided on the charge lever 151 rotates a shutter charge lever 160 through a pin 161 thereon to charge the opening and closing blade groups.

According to the above described second and third embodiments, after a film exposure, the light shielding member 10a–10c is returned to its working position to block the photographing path at first and then the shutter is charged. These embodiments have a particular effect to prevent leakage light into film. Returning movement of the opening blade group 5a–5d and the closing blade group 6a–6d to their starting positions shown in FIG. 1 may bring forth a loose contact between each two neighbouring blades at the time of the shutter being charged. Such insufficient closeness of contact between neighbouring blades, if it occurs, will result in reduction of light-tightness. However, according to the above embodiments, since the light shielding member is returned to its starting position prior to charging of the shutter, there is no fear of leakage light reaching the film even when the light-tightness of the blades is reduced.

Figure 5:
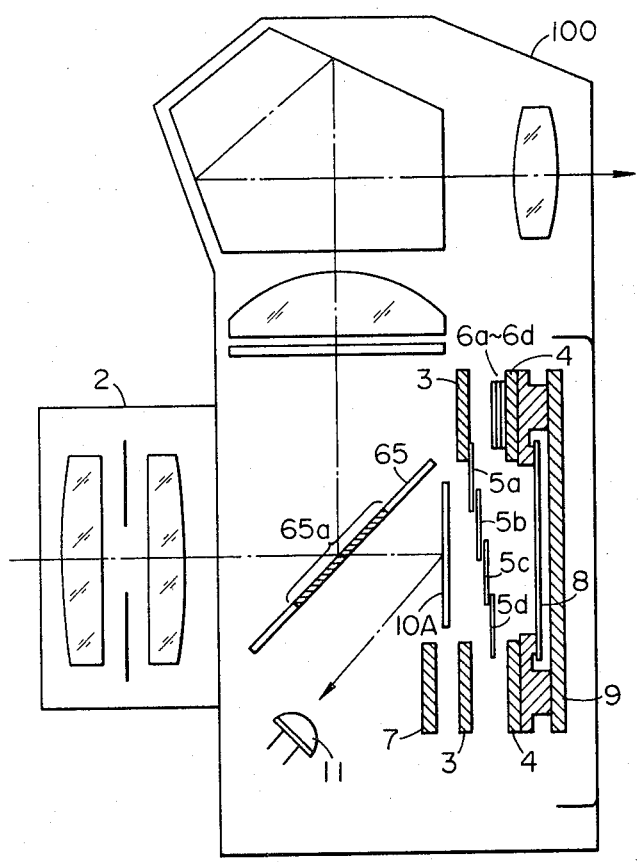
FIG. 5 shows the fourth embodiment of the invention in a view similar to FIG. 1.

In the fourth embodiment shown in FIG. 5, the present invention is applied to a single lens reflex camera.

Designated by 65 is a main mirror, a portion 65a of which is formed as half mirror. Therefore, even when the mirror is in the position of mirror-down it is possible for the light receiving element 11 to receive the reflected light from the light shielding member 10A. Therefore, by storing the output from the light receiving element in a memory it is made possible to carry out shutter control in this position. Furthermore, display of exposure value is made possible using the output. This makes it unnecessary to provide a separate light receiving element for display at the penta-prism part which was required for a conventional single lens reflex camera.

Figure 6:
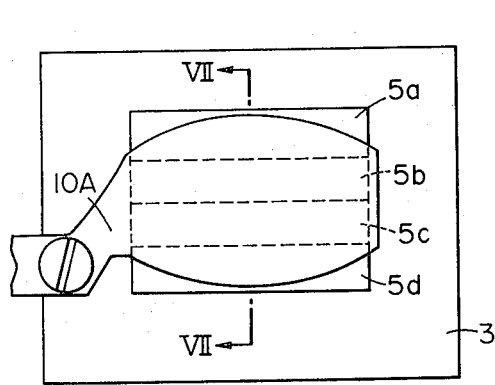
FIG. 6 is a front view of the fourth embodiment.

As seen from FIG. 6, the light shielding member 10A used in the embodiment is composed of one single plate. This is because the camera body has at its bottom part a sufficient space to receive the light shielding plate 10A. In addition, in this embodiment, the light shielding member is so shaped as not to cover the whole surface of the shutter opening blade group 5a–5d but to cover the boundary portions between blades sufficiently. The marginal especially four corner portions of the picture frame remain uncovered. Such shape of the light shielding member 10A serves not only to minimize the mass of the light shielding plate but also to accommodate it to selection of the metering area.

While the invention has been particularly shown and described with reference to preferred embodiments thereof, various modifications and variation are possible in light of the above teachings. For example, in the above examples, the timing of the shutter opening blade group 5a–5d has been selected in the manner that the shutter opening blade group starts running after the light shielding member 10a–10c or 10A has been completely or substantially moved to its retracted position out of the photographing light path. However, the opening blade group may be started running at the same time or with a short delay to the start of running of the light shielding member while moving the blade group and the light shielding member at nearly the same speed. In this case, the delay time is so selected as not to expose the opening blade group to light substantially. This modification can be realized, for example, by designing the release lever 26 shown in FIG. 2 in such manner that its projection 26c can push down the opening blade release lever 28 at nearly the same time that another projection 26b of the release lever 26 rotates the lever 23. By employing such modification the time from the operation of release button 30 to the actual releasing of the shutter can be minimized. Moreover, by setting the reflection power of the surface of the light shielding member to a value almost equal to that of the film while selecting the running speed and timing of the light shielding member and shutter blades in the above-mentioned manner, it is made possible to carry out the so-called direct photo metering. Namely, it is made possible to control exposure time depending upon the output coming from a light receiving element which can receive the reflected light from the surface of the light shielding member and from the film surface simultaneously with the start of retraction of the light shielding member.

Also, the light shielding member may be moved to its retraction position in a different manner from that described above. For example, rotational type of retracting movement as in the case of a quick return mirror usually used in a single lens reflex camera may be used for a light shielding member.

As for the reflection surface of the light shielding member, various modifications are possible within the scope of the invention. The reflection surface may be designed to have such reflection characteristics as determined taking into consideration the characteristic of brightness distribution of the object. For example, it is preferred that when the object is a landscape the reflectance of the reflection surface for the light toward the top (sky part) of the picture is somewhat lower than the reflectance of the reflection surface for the light toward the bottom (ground part). Use of the light shielding member having such reflection characteristics makes it possible to obtain a better exposure less affected by the brightness of the sky part. Concretely, this may be attained by coloring the reflecting surface of the plate 10c of the light shielding member shown in FIG. 1 in such manner that the reflecting surface has a lower reflection power than those of the reflecting surfaces of other plates 10a and 10b.

As another modification, the reflecting surface of the light shielding member may be formed as an uneven surface or curved surface to give the reflected light a certain directivity.

Figure 7:
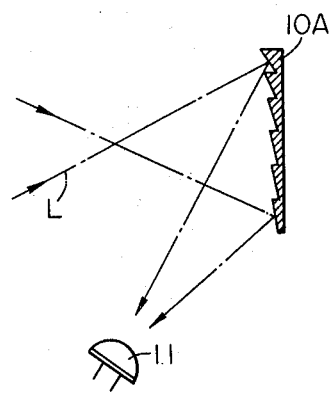
FIG. 7 is a sectional view taken along the line VII—VII in FIG. 6.

FIG. 7 shows a form of such light shielding member 10A having a particularly designed reflecting surface. This reflecting surface is able to direct to the light receiving element 11 also rays 1, which will otherwise not enter the light receiving element but be reflected in the direction upward away from the light receiving element. Use of such reflecting surface makes it possible to uniformly meter the light over the whole surface of a picture to be taken.

We claim:

1. In a camera having a focal plane shutter of the type which comprises a group of opening blades and a group of closing blades for opening and closing the exposure aperture of said camera wherein each blade is responsible for covering each corresponding area of the aperture and all the blades in each group together can cover the whole area of the aperture, and a light receiving element for metering the light transmitted through the photographing lens of said camera, the improvement comprising:
    (a) a light shielding member provided in the photographing light path on the front side of said focal plane shutter for shielding at least a boundary area between neighboring blades in each group relative to said transmitted light and disposed to reflect the photographing light toward said light receiving element, said light shielding member including a plural number of light shielding plates adapted to overlap each other; and
    (b) means for displacing said light shielding plates relative to each other to retract them to a position out of said photographing light path before exposure.

2. A camera according to claim 1, wherein said blades in each group, when they are in the position to close the aperture, are disposed with each neighboring blades being in overlapping disposition with each other at said boundary area and said light shielding plates have their boundary portions overlapping each other in the opposite direction to the direction in which said blades overlap each other.

3. A camera according to claim 2, wherein said plural number of light shielding plates of the shading member are so disposed as to block the photographing light at different areas divided vertically relative to said camera and wherein the light shielding plate disposed to block, when it is in the photographing light path, such part of the photographing light corresponding to the sky part of the object has a lower reflection power as compared with other shading plates.

4. A camera according to claim 1, wherein said camera further comprises a shelter wall (7) which has a surface of low reflection power and which is disposed to cover said light shielding plates against the transmitted light through said photographing lens when said light shielding plates are in the retracted position out of the photographing light path.

5. A camera according to claim 1, wherein said camera further comprises means for returning said light shielding member to its starting position in the photographing light path after the completion of an exposure.

6. A camera according to claim 1, wherein said retracting means comprises operating means for displacing said light shielding member in link with the shutter releasing motion and having means for determining the timing of opening of the aperture by said opening blade group (26, 34-39, 134-139).

7. A camera according to claim 6, wherein said timing determining means determines the timing in such manner that said opening operation of the aperture is started after said light shielding member has completely been moved to its retracted position out of the photographing light path.

8. In a camera having a focal plane shutter of the type which comprises a group of opening blades and a group of closing blades for opening and closing the exposure aperture of said camera wherein each blade is responsible for covering each corresponding area of the aperture and all the blades in each group together can cover the whole area of the aperture, and a light receiving element for metering the light transmitted through the photographing lens of said camera, the improvement comprising:
    (a) a light shielding member provided in the photographing light path on the front side of said focal plane shutter for shielding at least a boundary area between neighboring blades in each group relative to said transmitted light and disposed to reflect the photographing light toward said light receiving element; said light shielding member being retractable to a position out of said photographing light path and being shaped in such manner that when it is in the photographing light path, said light shielding member allows the photographing light to reach those parts of blades corresponding to the marginal area of the picture to be taken; and
    (b) means for retracting said light shielding member to its retracted position before exposure.

9. A camera according to claim 8, wherein said light shielding member has a reflection surface facing said photographing lens and having a high reflection power.

10. A camera according to claim 9, wherein said camera further comprises a shelter wall (7) which has a surface of low reflection power and which is disposed to be able to cover said light shielding member against the transmitted light through said photographing lens when said light shielding member is in the retracted position out of the photographing light path.

11. A camera according to claim 9, wherein said reflection surface is so shaped as to give the reflected light a directivity toward said photo element.

12. In a camera having a focal plane shutter of the type which comprises a group of opening blades and a group of closing blades for opening and closing the exposure aperture of said camera wherein each blade is responsible for covering each corresponding area of the aperture and all the blades in each group together can cover the whole area of the aperture, and a light receiving element for metering the light transmitted through the photographing lens of said camera, the improvement comprising:
    (a) a light shielding member provided in the photographing light path on the front side of said focal plane shutter for shielding at least a boundary area between each neighboring blades in each group from the photographing light relative to said transmitted light and disposed to reflect the photographing light toward said light receiving element, said light shielding member being retractable to a position out of said photographing light path;
    (b) means for retracting said light shielding member to its retracted position before exposure; and (c) said blade in each group, when they are in the position to close the aperture, being disposed with each neighboring blades being overlapped relative to each other at said boundary area and said light shielding member comprising a plural number of light shielding plates (10a, 10b, 10c) with their boundary portions being overlapped each other in the opposite direction to the direction in which said blades are overlapped relative to each other.

13. A camera according to claim 12, wherein said plural number of light shielding plates of the shading member are so disposed as to block the photographing light at different areas divided vertically relative to said camera and wherein the light shielding plate disposed to block, when it is in the photographing light path, such part of the photographing light corresponding to the sky part of the object has a lower reflection power as compared with other shading plates.

14. In a camera having a focal plane shutter of the type which comprises a group of opening blades and a group of closing blades for opening and closing the exposure aperture of said camera wherein each blade is responsible for covering each corresponding area of the aperture and all the blades in each group together can cover the whole area of the aperture, and a light receiving element for metering the light transmitted through the photographing lens of said camera, the improvement comprising:
    (a) a light shielding member provided in the photographing light path on the front side of said focal plane shutter relative to said transmitted light and disposed to reflect the photographing light toward said light receiving element, said light shielding member being retractable to a position out of said photographing light path; and
    (b) means for retracting said light shielding member to its retracted position before exposure, said retracting means comprising operating means for displacing said light shielding member in link with the shutter releasing motion nearly at the same speed at the speed at which said opening blade group opens said aperture, and having means for determining the timing of opening of the aperture by said opening blade group (26, 34-39, 134-139) in such manner that said aperture opening operation is started nearly simultaneously with the start of displacement of said light shielding member.

15. In a camera having a focal plane shutter of the type which comprises a group of opening blades and a group of closing blades for opening and closing the exposure aperture of said camera wherein each blade is responsible for covering each corresponding area of the aperture and all the blades in each group together can cover the whole area of the aperture, and a light receiving element for metering the light transmitted through the photographing lens of said camera, the improvement comprising:
    (a) a light shielding member provided in the photographing light path adjacent to said focal plane shutter for shielding at least a boundary area between neighboring blades in said opening group relative to said transmitted light and disposed to reflect the photographing light toward said light receiving element, said light shielding member including a plural number of light shielding plates adapted to overlap each other; and
    (b) means for displacing said light shielding plates relative to each other to retract them to a position out of said photographing light path before exposure.

16. In a camera having a focal plane and a focal plane shutter of the type which comprises a group of opening blades and a group of closing blades for opening and closing the exposure aperture of said camera wherein each blade is responsible for covering each corresponding area of the aperture and all the blades in each group together can cover the whole area of the aperture, the improvement comprising:
    (a) a light shielding member provided in the photographing light path on the front side of said focal plane shutter relative to said transmitted light, said light shielding member being retractable to a position out of said photographing light path;
    (b) means for retracting said light shielding member in a direction parallel to said focal plane to its retracted position before exposure; and
    (c) means for returning said light shielding member to its starting position in the photographing light path in link with the aperture closing operation by said closing blade group.

17. In a camera having a focal plane and a focal plane shutter of the type which comprises a group of opening blades and a group of closing blades for opening and closing the exposure aperture of said camera wherein each blade is responsible for covering each corresponding area of the aperture and all the blades in each group together can cover the whole area of the aperture, and a light receiving element for metering the light transmitted through the photographing lens of said camera, the improvement comprising:
    (a) a light shielding member provided in the photographing light path on the front side of said focal plane shutter relative to said transmitted light and disposed to reflect the photographing light toward said light receiving element, said light shielding member being retractable to a position out of said photographing light path; and
    (b) means for retracting said light shielding member in a direction parallel to said focal plane to its retracted position before exposure.

18. A camera according to claim 17, wherein said retracting means retracts said light shielding member in the same direction as the moving direction of said opening blade group to open said aperture.

19. A camera according to claim 18, wherein said retracting means retracts said light shielding member with relation to the operation for opening the exposure aperture of said focal plane shutter.

20. A camera according to claim 18, further comprises means for starting said opening blade group for opening the aperture substantially simultaneously with the start of retraction of said light shielding member.

21. A camera according to claim 20, wherein said retracting means comprises operating means for displacing said light shielding member in link with the shutter releasing motion at substantially the same speed as the speed at which said opening blade group opens said aperture.

22. A camera according to claim 17, further comprising means for returning said light shielding member to its starting position in the photographing light path in link with the aperture closing operation by said closing blade group.

23. A camera according to claim 17, further comprising means for returning said light shielding member to its starting position in the photographing light path before said opening and closing blade groups are started moving for returning to these starting positions.

* * * * *

UNITED STATES PATENT AND TRADEMARK OFFICE
CERTIFICATE OF CORRECTION

PATENT NO. : 4,407,574

DATED : October 4, 1983

INVENTOR(S) : NAOKI TOMINO, ET AL.

It is certified that error appears in the above-identified patent and that said Letters Patent is hereby corrected as shown below:

```
Column 1, line 19, change "The" to --TTL--.
Column 2, line 65, delete "enters".
Column 5, line 58, after "exposure" delete ",".
Column 6, line 3 , after "marginal" insert --area--.
Column 8, line 61, change "blades" to --blade--.
Column 9, line 1, change "blade" to --blades--;
         line 3, change "blades" to --blade--;
         line 41, change "at" (first occurrence) to
```

--as--.

Signed and Sealed this

Thirteenth Day of December 1983

[SEAL]

Attest:

GERALD J. MOSSINGHOFF

Attesting Officer

Commissioner of Patents and Trademarks